June 7, 1949.     C. MANNHEIMER     2,472,164
COOKING APPARATUS
Filed May 9, 1945     2 Sheets-Sheet 1
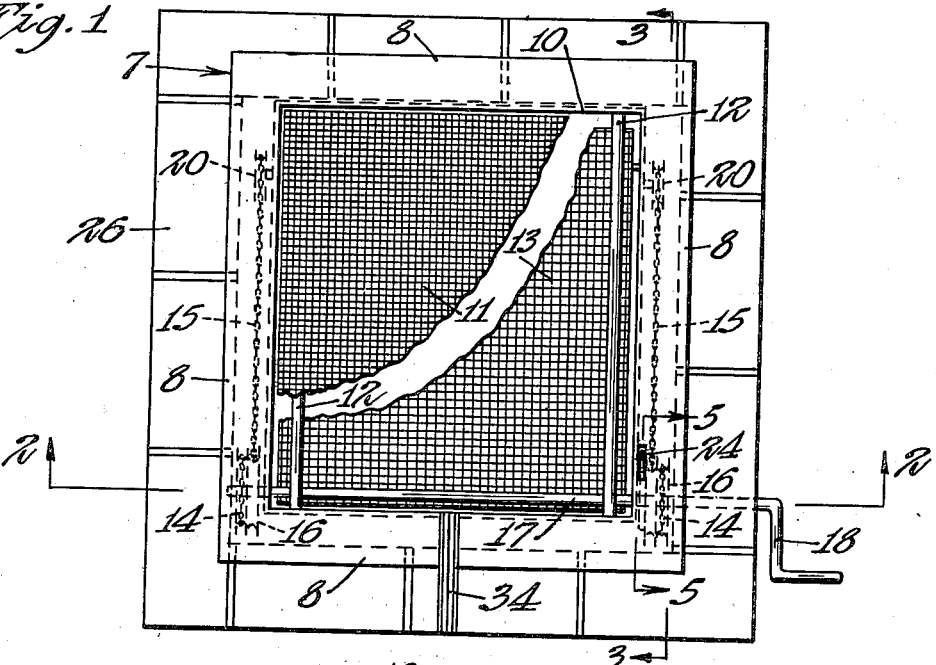
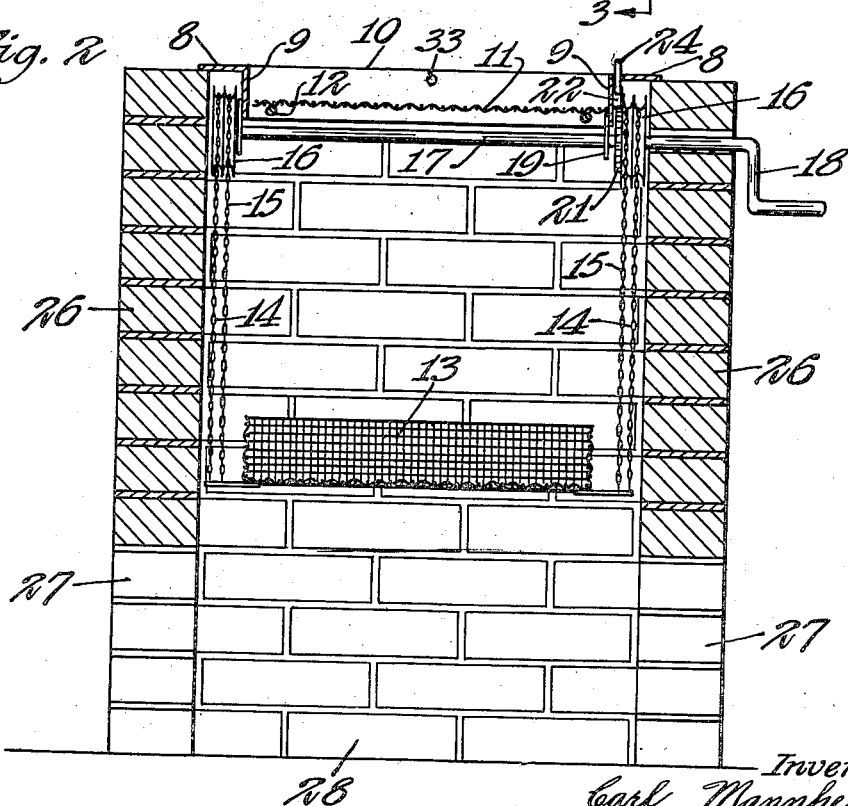
Inventor
Carl Mannheimer
By John E. Hughes Jr.
Attorney June 7, 1949. C. MANNHEIMER 2,472,164
COOKING APPARATUS
Filed May 9, 1945 2 Sheets-Sheet 2
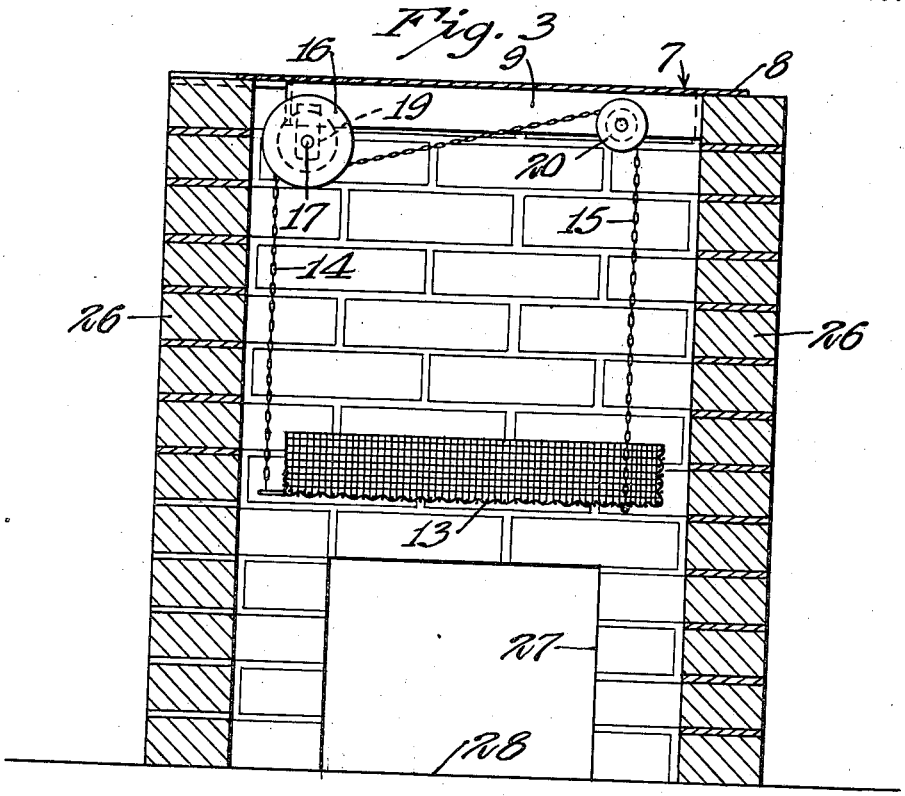
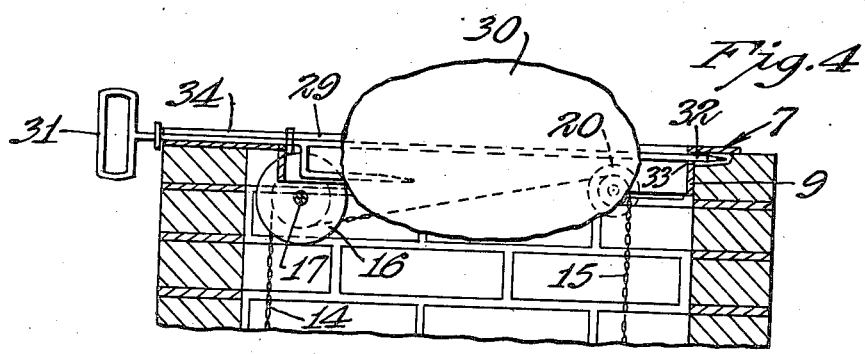
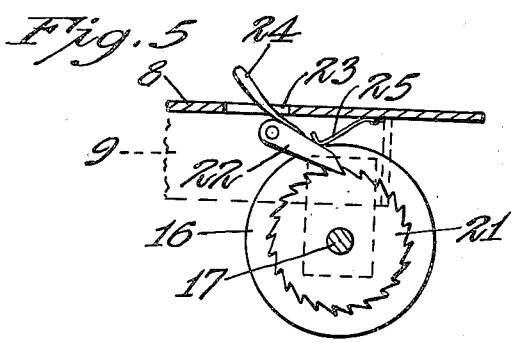
Inventor
Carl Mannheimer
By John E. Stryker Jr.
Attorney Patented June 7, 1949

2,472,164

UNITED STATES PATENT OFFICE 2,472,164

COOKING APPARATUS

Carl Mannheimer, St. Paul, Minn.

Application May 9, 1945, Serial No. 592,732

3 Claims. (Cl. 126—25)

This invention relates to cooking apparatus adapted to be installed in a fireplace, either in a dwelling or out of doors, for controlling the intensity of the heat supplied to the food to be cooked.

It is an object of my invention to provide novel apparatus of this kind adapted to facilitate adjustment of the spacing of the heat source relative to the food to be broiled, barbecued or otherwise cooked.

A particular object is to provide means for supporting meat or other food at a substantially fixed elevation and novel means for supporting a fuel burner such as a fire basket beneath the food support and for quickly and easily adjusting the elevation of the basket to regulate the spacing of the heat source from the food support.

A further object is to provide in combination with apparatus having a vertically adjustable fire basket a combustion chamber having an open, horizontally extending upper end upon which the apparatus is supported and a plurality of openings extending upward from the lower end of the chamber to admit air for combustion and to allow access to the fire basket for feeding fuel thereto.

A still further object is to provide inexpensive apparatus of this class which is adapted to be collapsed in compact form for packaging and shipping.

Referring to the accompanying drawings which illustrate a preferred form of my invention:

Figure 1 is a plan view of the apparatus and fireplace with portions of the grill and fire basket broken away;

Fig. 2 is a vertical section taken approximately on the line 2—2 of Fig. 1;

Fig. 3 is a vertical section taken approximately on the line 3—3 of Fig. 1;

Fig. 4 is a fragmentary, central vertical section through the upper portion of the apparatus with the grill removed and a rotatable spit substituted therefor as a support for meat to be roasted or barbecued, and Fig. 5 is a fragmentary section taken on the line 5—5 of Fig. 1 and showing a suitable arrangement of ratchet and pawl associated with the reels for retaining the fire basket at adjusted elevations.

In the drawing, the numeral 7 indicates generally a rigid frame for the apparatus which is preferably constructed from angle bars having horizontally extending flanges 8 and vertically extending flanges 9 defining a rectangular opening 10 at the top of a combustion chamber. A grill 11 for supporting certain kinds of food to be cooked may be mounted within the opening 10 on horizontally extending rods 12.

Extending horizontally beneath the grill 11 is a fire basket 13 suspended on pairs of flexible members 14 and 15 which may comprise chains or fine wire cables. These members are connected at their lower ends to the respective corner portions of the basket 13. Reels 16 are provided to receive and actuate these flexible members so that the basket 13 is readily adjustable to various elevations. Extending horizontally in parallel relation to one side of the frame 7 is a shaft 17 provided with a manually operable crank 18 at one end. The reels 16 are fixed on the shaft 17 and the latter is supported in bearings 19 fixed on the frame 7. An end of each of the flexible members 14 is secured to one of the reels 16 and these members extend tangentially downward to the basket from the peripheries of the reels. Each of the members 15 is similarly fastened to a reel 16 and arranged to extend tangentially from the lower periphery thereof to a guide pulley 20 and thence downward to the basket 13. As further indicated in Fig. 3, the flexible members 14 and 15 are arranged to be wound on the reels 16 when the latter are turned in a clockwise direction.

To lock or retain the fire basket 13 at adjusted elevations I provide a ratchet wheel 21 and pawl 22 (Figs. 2 and 5). This ratchet wheel is fixed on the shaft 17 adjacent to one of the reels 16 and the pawl 22 is pivotally supported on the adjacent flange 9 of the frame in position to engage the teeth of the wheel 21. Projecting upward from the pawl 22 through an opening 23 in the flange 8 is a handle 24 adapted to be actuated to release the pawl from engagement with the wheel 21. The pawl is normally held by gravity in engagement with the teeth and it may also be spring biased, as by a spring 25 projecting from the frame.

A fireplace to receive the apparatus hereinbefore described may comprise a rectangular combustion chamber formed from brick, masonry, concrete or other suitable material. As shown, four vertically disposed walls 26, constructed from brick, support the frame 7 at a convenient elevation. The open upper end of the combustion chamber formed by these walls is adapted to receive the pendant flanges 9 which are spaced from the inner surfaces of the walls to permit the reels 16, pulleys 20, ratchet wheel 21, pawl 22, and upper portions of the flexible members 14 and 15 to be substantially concealed from view in the assembled structure. Selected walls 26 are formed with openings 27 extending upward from hearth or ground level 28 to admit air for combustion and also to afford access to the fire basket 13 for feeding fuel thereto when this basket is lowered to rest on the hearth or ground.

As indicated in Fig. 4, a spit 29 may be substituted for the grill 11 to support a fowl or large piece of meat 30. This spit has a handle 31 at one end to facilitate turning it and a straight end 32 adapted to be inserted in an opening 33 in one of the flanges 9. A bearing 34 on the front wall is provided in alignment with the opening 33 to revolubly support the spit 29 (Figs. 1, 2 and 4).

In operation, wood, charcoal or other fuel may be placed in the basket 13 and ignited and the meat or other food to be cooked is placed either on the grill 11 or spit 29, or in a suitable cooking utensil supported on the grill. By operating the crank 18 the fuel basket may be raised to any desired elevation with respect to the food which remains conveniently accessible and readily visible on the fixed grill 11 or spit 29. As the cooking progresses the elevation of the fire basket is adjusted from time to time to give the degree of heat required. To lower the basket 13 it is only necessary to press down the pawl handle 24, thus releasing the ratchet wheel 21 and allowing the flexible members 14 and 15 to unwind from the reels 16 under the force of gravity. When the handle 24 is released the pawl 22 engages the ratchet wheel 21 to stop the downward movement of the fire basket. The ratchet and pawl thus retain the basket at any selected position within the limits of movement permitted by the ground 28 and elevation of the reels 16. Fuel may be fed to the basket 13 from time to time through either the openings 27 in the walls 26, without disturbing the food, after merely lowering the basket 13 sufficiently to make it accessible through the openings 27.

A hood or superstructure having a top opening or smoke pipe for the escape of the products of combustion may be placed on or otherwise supported above the walls 27, or these walls may be built up leaving one side open for access to the grill 11 and/or spit 29, if desired. However, it will be understood that such hood or superstructure is not essential to the operation of my invention.

For shipping purposes the fire basket 13 and grill 11 are nested in the frame 7 to form a compact package and the crank 18 is preferably made removable from the end of the shaft 17 so that the complete apparatus, exclusive of the fireplace, may be placed in a shallow rectangular shipping container for sale. It is subsequently installed in a fireplace of suitable dimensions as herein described. My apparatus affords a wide range of adjustment for the spacing of the burner or fire basket from the food to be cooked, this range being such that by lowering the basket to the ground level 28 a mild temperature, just sufficient to keep foods warm, may be afforded or any higher temperature may be provided at the cooking elevation within an upper limit which depends on the character of the fuel used and location of the fuel closely adjacent to the food support at the top of the structure.

Having described my invention, what I claim as new and desire to protect by Letters Patent is:

1. For a combustion chamber having walls, cooking apparatus comprising, a substantially rectangular frame formed from angle bars adapted to extend horizontally on said walls and to define a top opening of said combustion chamber, said frame having horizontally extending flanges adapted to be removably supported on the walls of said chamber and substantially vertical flanges depending within said top opening, a horizontally extending grill and a plurality of reels mounted on said frame, flexible members depending from and connected to said reels to be wound thereon, a fire basket supported on the lower ends of said members and movable to and from said grill beneath the same, manually operable means for actuating said reels and means for retaining said basket at adjusted elevations.

2. For a combustion chamber having walls, cooking apparatus comprising, a frame adapted to extend horizontally on said walls and to define a top opening of said combustion chamber, said frame having horizontally disposed flanges adapted to be removably supported on the combustion chamber walls and vertical flanges depending from the inner edges of said horizontal flanges, a food support and a plurality of reels mounted on said frame, said reels being revolubly supported adjacent to the outer surfaces respectively of selected vertical flanges of said frame, flexible members depending from and connected respectively to said reels to be wound thereon, a fire basket supported on the lower ends of said members and movable to and from said food support beneath the same, means for actuating said reels and means associated with said reels to retain said basket at adjusted elevations.

3. For a combustion chamber having walls, cooking apparatus comprising, a rectangular angle bar frame adapted to extend horizontally on said walls and to define a top opening of said combustion chamber, said frame having horizontally extending flanges projecting outward to be removably supported on the top of the combustion chamber and pendant, substantially vertical flanges at opposite sides of said opening, a substantially horizontal shaft mounted on said vertical flanges, reels fixed on said shaft adjacent to the outer surfaces respectively of said vertical flanges, flexible members depending from and connected respectively to said reels to be wound thereon, a fire basket supported on the lower ends of said flexible members, a food support mounted on said frame and manually operable means for rotating said shaft and reels.

CARL MANNHEIMER.

REFERENCES CITED

The following references are of record in the file of this patent:

UNITED STATES PATENTS

| Number | Name | Date |
|---|---|---|
|  | McNary | Mar. 24, 1835 |
|  | Wilson | Mar. 23, 1836 |
| 221,682 | Kintz | Nov. 18, 1879 |
| 696,040 | Haslam | Mar. 25, 1902 |
| 1,853,319 | Polhemus | Apr. 12, 1932 |
| 2,114,697 | Babin | Apr. 19, 1938 |
| 2,114,698 | Babin | Apr. 19, 1938 |
| 2,122,275 | Bitney | June 28, 1938 |
| 2,307,914 | Bitney | June 12, 1943 |